(12) United States Patent
Abrishamkar et al.

(10) Patent No.: US 6,771,616 B2
(45) Date of Patent: *Aug. 3, 2004

(54) SEQUENTIAL COMBINED QPCH DEMODULATION

(75) Inventors: Farrokh Abrishamkar, San Diego, CA (US); Mark Roh, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 09/952,722

(22) Filed: Sep. 13, 2001

(65) Prior Publication Data

US 2002/0142784 A1 Oct. 3, 2002

(51) Int. Cl.[7] .............................................. H04Q 1/00
(52) U.S. Cl. ...................... 370/320; 340/7.42; 455/458; 455/432
(58) Field of Search .................... 340/7.42; 370/311, 370/320, 329, 335; 455/458, 432, 522, 574

(56) References Cited

U.S. PATENT DOCUMENTS

| | | | | |
|---|---|---|---|---|
| 6,111,865 A | * | 8/2000 | Butler et al. ............... | 370/335 |
| 6,138,034 A | * | 10/2000 | Willey ....................... | 455/522 |
| 6,243,561 B1 | * | 6/2001 | Butler et al. .............. | 340/7.42 |
| 6,307,846 B1 | * | 10/2001 | Willey ....................... | 370/329 |
| 6,421,540 B1 | * | 7/2002 | Gilhousen et al. .......... | 455/458 |
| 6,505,058 B1 | * | 1/2003 | Willey ....................... | 455/574 |
| 6,507,743 B1 | * | 1/2003 | Abrishamkar et al. ...... | 455/458 |
| 2003/0031140 A1 | * | 2/2003 | Oprescu-Surcobe ........ | 370/311 |

FOREIGN PATENT DOCUMENTS

| | | | |
|---|---|---|---|
| WO | 0154430 | 7/2001 | ............ H04Q/7/00 |
| WO | 0154432 | 7/2001 | ............ H04Q/7/00 |
| WO | 0154445 | 7/2001 | ............ H04Q/7/00 |

* cited by examiner

Primary Examiner—Brian Zimmerman
(74) Attorney, Agent, or Firm—Philip R. Wadsworth; Charles D. Brown; Howard H. Seo

(57) ABSTRACT

A system determines if a primary paging channel should be received based on an examination of a quick paging channel. A first QPCH symbol is examined (102) and the normalized pilot energy is determined (104). If the normalized pilot energy is above a first threshold (106), the symbol is demodulated and the QPCH-symbol-to-pilot-energy ratio is determined (110) and compared against another threshold (114). If the normalized pilot energy is below the first threshold, the system proceeds to the second QPCH symbol immediately. Based on the two comparisons, a second QPCH signal is examined (108) or the system sleeps (116). If the second signal is examined, and if its normalized pilot energy is high enough, it also is demodulated and the ratio of the sum-of-the-combined-QPCH-symbols to the sum-of-the-combined-pilot-energies is determined (122). If this ratio exceeds a threshold (124), the primary paging channel is processed (120); otherwise the system sleeps (116).

17 Claims, 3 Drawing Sheets

SEQUENTIAL COMBINED QPCH DEMODULATION

BACKGROUND OF THE INVENTION

1. Field of Invention

This invention relates to wireless communications systems. Specifically, the present invention relates to receivers for demodulating quick paging channels in communications systems employing more than one paging channel to facilitate offline processing.

2. Description of the Related Art

Wireless communications systems are employed in a variety of demanding applications ranging from search and rescue to Internet applications. Such applications require reliable, cost-effective, and space-efficient communications systems with accompanying wireless phones having maximum battery life and associated standby time.

Cellular telecommunications systems, such as Code Division Multiple access (CDMA) communications systems, are often characterized by a plurality of mobile stations (e.g. cellular telephones, mobile units, wireless telephones, or mobile phones) in communication with one or more Base Station Transceiver Subsystems (BTS's). Signals transmitted by the mobile stations are received by a BTS and often relayed to a Mobile Switching Center (MSC) having a Base Station Controller (BSC). The MSC, in turn, routes the signal to a Public Switched Telephone Network (PSTN) or to another wireless phone. Similarly, a signal may be transmitted from the Public Switched Telephone Network to a wireless phone via a base station or BTS and an MSC.

Wireless communications networks often employ various channels, such as paging channels and traffic channels, as disclosed in the IS-95 cellular telephone standard, to facilitate communications between a wireless phone and a BTS. Paging messages are transmitted over a paging channel by a BTS to an associated wireless phone to indicate an incoming call. When a wireless phone detects a paging message, a sequence of service negotiation messages is transmitted between the wireless phone and an associated BTS to establish a traffic channel. A traffic channel typically supports voice and data traffic.

Conventionally, a wireless telephone continuously monitors the paging channel for pages indicative of incoming calls. The receiver of the wireless phone remains on while signal processing circuitry within the wireless phone demodulates the paging channel to determine if a page was sent. Unfortunately, the receiver draws excess power, which significantly limits phone battery life.

Systems for minimizing wireless phone power consumption are often employed in the wireless phone and/or accompanying network to extend phone battery life, i.e., standby time. To improve standby time, some newer wireless phones operate in slotted mode. In slotted mode, the receiver of the wireless phone is periodically activated in accordance with predetermined paging slots established in accordance with the IS-95 telecommunications standard. An associated BTS transmits pages during the paging slots. Wireless phone standby time is extended by periodically powering-up the receiver and demodulating the paging channel rather than continuously demodulating the full paging channel as done previously.

Unfortunately, paging channel messages are often long and require extensive processing, which increases phone power consumption and reduces battery life and associated standby time. Furthermore, the design of such systems and the associated paging channels necessitates redundant processing of the lengthy paging channel messages to detect incoming calls. This further reduces phone battery life.

Further increases in phone standby time are achieved via a relatively new addition to the IS-95 telecommunications standard known as offline processing. In a wireless communications network employing offline processing, a pair of Quick Paging Channel (QPCH) symbols is periodically transmitted to the wireless phone. The quick paging channel symbols, i.e., quick pages, indicate the presence or absence of an incoming call to be established on a forthcoming traffic channel (F-CCCH). The QPCH symbols arrive in pairs at 9600 bits per second (bps) or 4800 bps. The time slots at which the QPCH symbols are transmitted from an associated BTS are known by the wireless phone, which periodically powers-up the receiver at corresponding time slots.

In a wireless phone employing offline processing, the wireless phone receiver powers-up, samples the QPCH, then immediately powers-down the receiver and processes the QPCH sample offline (when the receiver is off). Subsequent analysis of the QPCH sample or samples indicates whether the wireless phone should power-up the receiver and demodulate the paging channel to receive an incoming page associated with an incoming call. Use of the QCPH helps minimize receiver activation time and the instances of complete paging channel demodulation, enabling a reduction in wireless phone power consumption and an associated extension in phone battery life. Unfortunately, existing systems and methods for demodulating the QPCH and deciding whether or not to process the subsequent full paging channel based on the QPCH are undesirably large, expensive, consume excess power, and are generally inefficient. Furthermore, existing systems often fail to effectively employ the first symbol or both symbols of the QPCH as needed to effectively determine whether to process the forthcoming full paging channel.

Hence, a need exists in the art for an efficient and cost effective system and method for receiving and processing quick paging channel symbols to determine whether or not to process the forthcoming full paging channel. There exists a further need for an efficient system and method that selectively employs either one or both symbols of each quick paging channel slot, in accordance with the existing signal environment, to most efficiently and reliably detect the presence of an incoming page via minimal requisite hardware.

SUMMARY OF THE INVENTION

The need in the art is addressed by the efficient system for determining if a primary paging channel should be received and processed of the present invention. In the illustrative embodiment, the inventive system is adapted for use with a wireless communications device in a wireless communications system employing quick paging channel. The system includes a first mechanism for receiving an electromagnetic signal having pilot signal and quick paging signal components. A second mechanism ascertains whether a second symbol of the quick paging channel signal should be immediately analyzed based on a first quality parameter and a first decision metric associated with a first symbol of the quick paging signal and provides a first indication in response thereto. The first decision metric is representative of a value of the first symbol. A third mechanism determines, via the second symbol, whether the primary paging channel should be immediately processed based on a second quality parameter and a second decision metric associated with the second symbol. The third mechanism provides a second indication in response thereto when the first indication indicates that the second symbol should be immediately analyzed.

In a specific embodiment, the first quality parameter and the second quality parameter are based on a portion of the pilot signal associated with the first symbol and the second symbol, respectively. The first and second quality parameters are normalized pilot energies that are indicative of a quality of a signal environment in which the electromagnetic signal is propagating. The first decision metric is determined in accordance with the following metric ($D_1$):

$$D_1 = \frac{QP_1}{E_{pilot1}}$$

where $D_1$ is the first decision metric; $QP_1$ is the dot product, cross product, or a combination thereof (depending on the mode of the transmission) of the first symbol with an estimate of the pilot signal associated with the first symbol; and $E_{pilot1}$ is an energy of the pilot signal associated with the first symbol.

The second decision metric is the demodulation symbol (D) defined in accordance with one of the following equation:

$$D = \frac{QP_1 + QP_2}{E_{pilot1} + E_{pilot2}},$$

where $QP_2$ is the dot product, cross product, or a combination thereof (depending on the mode of the mobile station) of the second symbol with an estimate of the pilot signal associated with the second symbol, and $E_{pilot2}$ is an energy of the second portion of the pilot signal.

The novel design of the present invention is facilitated by the first mechanism and the second mechanism, which strategically process the first quick paging channel symbol and/or the second paging channel signal as needed. This avoids sometimes unnecessary processing of the second quick paging channel symbol, yet provides for a maximum probability of successful detection of a forthcoming primary paging channel and reduces or eliminates instances of redundant processing of the primary paging channel.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
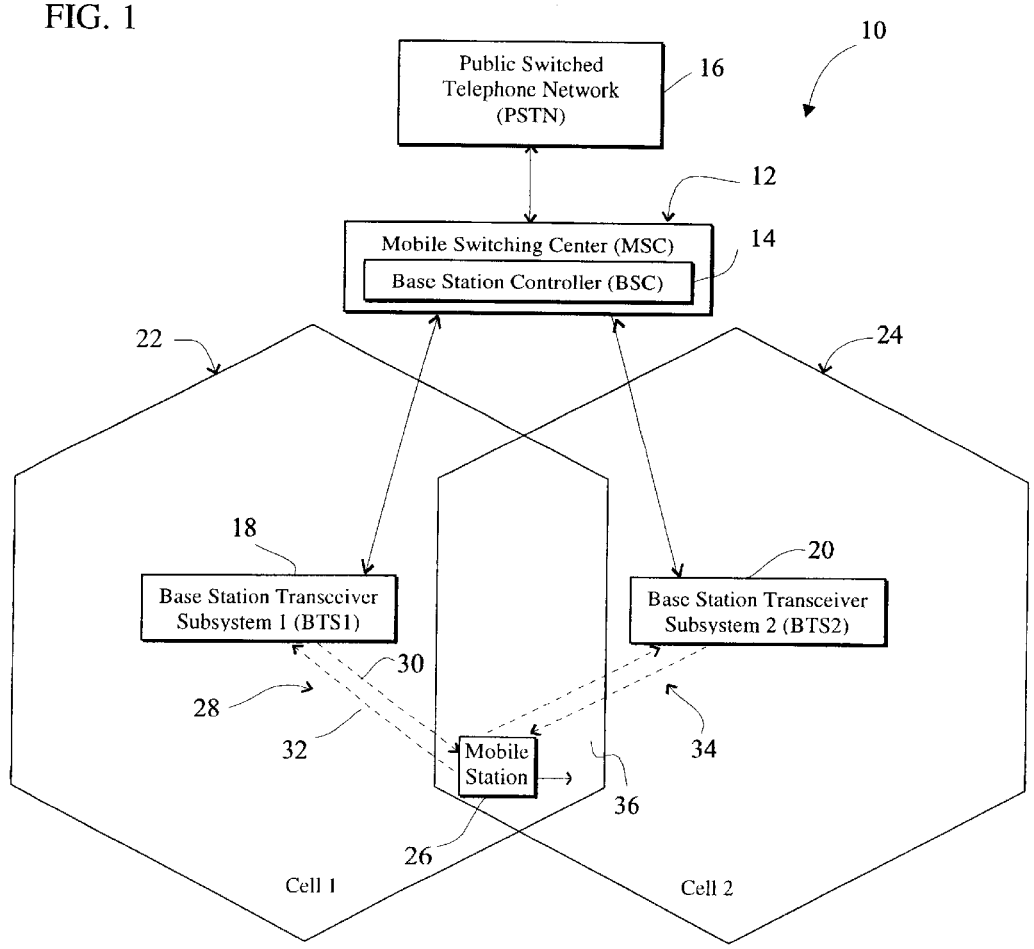
FIG. 1 is a diagram of an exemplary wireless communications system constructed in accordance with the teachings of the present invention.

FIG. 1 is a block diagram of an exemplary wireless communications system 10 for which the present invention is adapted. The system 10 includes a Mobile Switching Center (MSC) 12 having a Base Station Controller (BSC) 14. A Public Switched Telephone Network (PSTN) 16 routes calls from telephone lines and other networks and communications devices (not shown) to and from the MSC 12. The MSC 12 routes calls from the PSTN 16 to and from a first BTS 18 and a second BTS 20 associated with a first cell 22 and a second cell 24, respectively. The BTS's 18 and 20 are often called cell controllers.

The MSC 12 routes calls between the BTS's 18 and 20. The first BTS 18 directs calls to the first mobile station 26 within the first cell 22 via a first communications link 28. The communications link 28 is a two-way link having a forward link 30 and a reverse link 32. Typically, when the BTS 18 has established voice communications with the mobile station 26, the link 28 is characterized as a traffic channel. While only two BTS's 18 and 20 are shown in FIG. 1, more BTS's or fewer BTS's may be employed without departing from the scope of the present invention.

When the mobile station 26 moves from the first cell 22 to the second cell 24, the mobile station 26 is handed off to the second BTS 20. Handoff typically occurs in an overlap region 36 where the first cell 22 overlaps the second cell 24. In a soft handoff, the mobile station 26 establishes a second communications link 34 with the target BTS 20 in addition to the first communications link 28 with the source BTS 18. During a soft handoff, both the first link 28 and the second link 34 are maintained simultaneously. After the mobile station 26 has crossed into the second cell 24, it may drop the first communications link 28. In a hard handoff, the communications link 34 is not established. When the mobile station 26 moves from the first cell 22 to the second cell 24, the link 28 to the source BTS 18 is dropped and a new link is formed with the target BTS 20.

Figure 2:
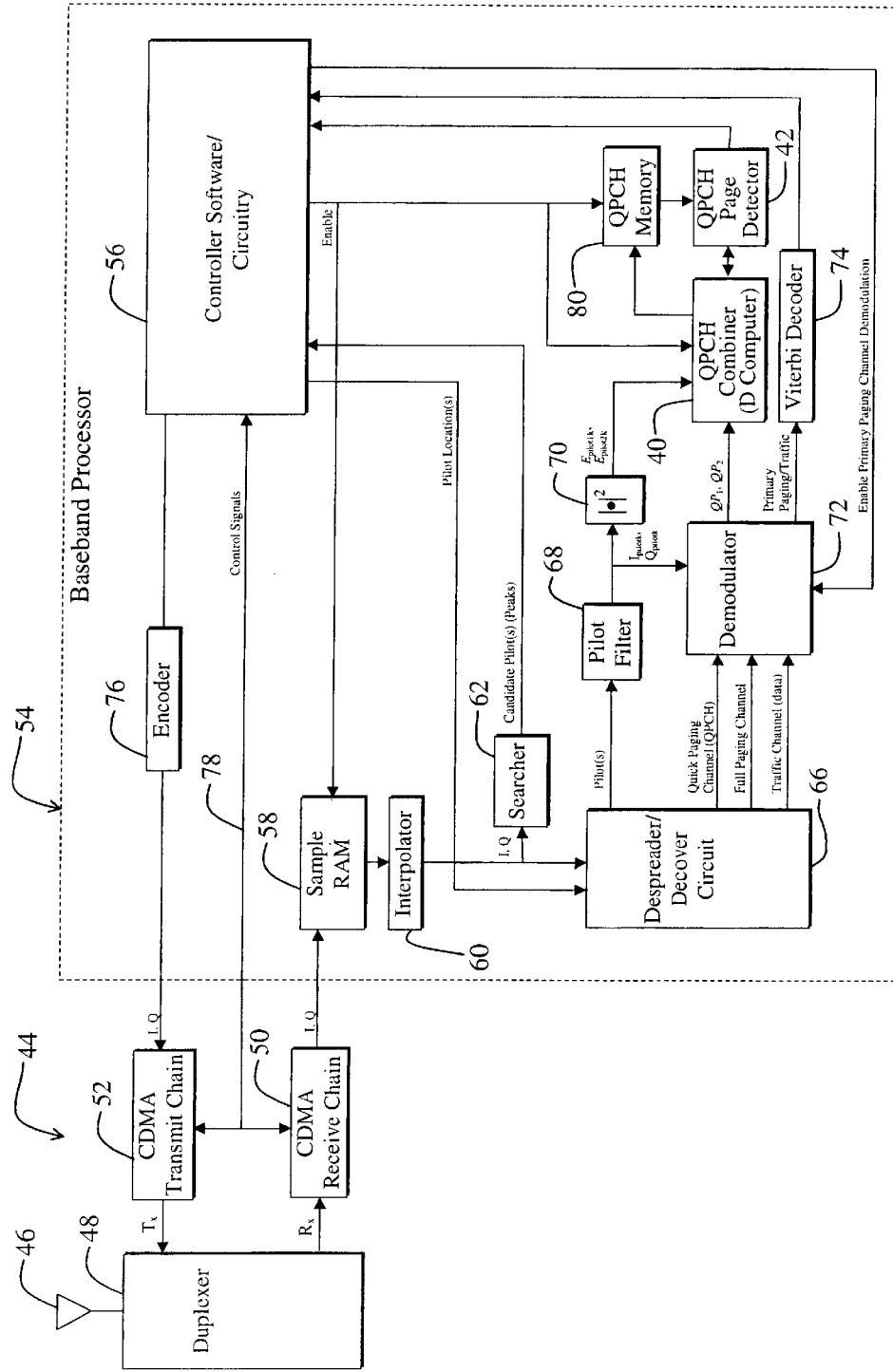
FIG. 2 is a more detailed diagram of the mobile station of FIG. 1 showing a unique quick paging channel (QPCH) combiner and QPCH detector constructed in accordance with the teachings of the present invention.

FIG. 2 is a more detailed diagram of the wireless phone, i.e., mobile station 26 of FIG. 1 showing a unique Quick Paging Channel (QPCH) combiner (demodulation symbol (D) computer) 40 and QPCH detector 42 constructed in accordance with the teachings of the present invention. For clarity, various components are omitted from FIG. 2, such as Intermediate Frequency (IF) to baseband converters, mixers, downconverters, oscillators, timers, power supplies, and amplifiers, however those skilled in the art will know where and how to implement the additional requisite components.

The mobile station 26 includes a transceiver 44 having an antenna 46 that is connected to a duplexer 48. The duplexer 48 is connected to an input of a CDMA receiver section 50 and to an output of a CDMA transmitter 52. A baseband processor 54 is connected to the CDMA transceiver 44 and includes a controller 56, a sample Random Access Memory (RAM) 58, an interpolator 60, a searcher 62, a received energy estimator 64, a despreader/decover circuit 66, a Pilot Estimator (pilot filter) 68, a pilot energy computation circuit 70, a demodulator 72, the QPCH combiner 40, the QPCH page detector 42, a Viterbi decoder 74, QPCH memory 80, and an encoder 76.

The controller 56 is connected to a bus 78 that provides control input to the CDMA transmitter 52 and the CDMA receiver 50. An output of the CDMA receiver 50 is a digital receive signal that is provided as input to the sample RAM 58 of the baseband processor 54. An output of the sample RAM 58 is input to the interpolator 60. An output of the interpolator 60 is connected to inputs of the searcher 62, and the despreader/decover circuit 66. An output of the searcher 62 represents peaks corresponding to candidate pilot signals, which are input to the controller software/circuitry 56. A pilot output of the despreader/decover circuit 66 represents a pilot signal estimate(s) that has k in-phase ($I_{pilot_k}$) and quadrature ($Q_{pilot_k}$) signal components, one $I_{pilot_k}$ and $Q_{pilot_k}$ component for each $k^{th}$ multipath signal component. The pilot output of the despreader/decover circuit 66 provides input to the pilot estimator (pilot filter) 68. The output of the pilot estimator 68 represents a filtered pilot estimate(s) and is input to the demodulator 72 and the pilot energy computation circuit 70. An output of the pilot energy computation circuit 70 is connected to an input of the QPCH combiner 40. The searcher 62 detects peaks corresponding to pilots. The peaks are provided to software running on the controller 56, which then provides them to the combiner 40 for combining after application-specific processing.

Traffic/data channel, primary (full) paging channel, and QPCH channel outputs of the despreader/decover circuit 66 are input to the demodulator 72. A dot product, cross product, and/or a (dot product+cross product) output, and a QPCH page output of the demodulator 72 are provided as input to the QPCH combiner 40. The (dot product+cross product) output may be omitted and the sum computed in the QPCH combiner 40 rather than in the demodulator 72 without departing from the scope of the present invention.

Traffic and primary paging channel outputs of the demodulator 72 are provided as input to the Viterbi decoder 74 after further processing via subsystems (not shown) such as scaling circuits and de-interleaving circuits (see IS-95 specifications). An output of the decoder 74 is connected to an input of the controller 56. The QPCH combiner 40 communicates with the page detector 42, an output of which is connected to an input of the controller 56. A QPCH memory 80 receives inputs from the QPCH combiner 40 and the controller software/circuitry 56 and provides output to the page detector 42.

In operation, CDMA signals received via the antenna 46 are directed to the CDMA receiver 50 via the duplexer 48. The CDMA receiver 50 includes radio frequency to intermediate frequency conversion circuitry (not shown) for mixing the received radio frequency signals (Rx) to intermediate frequency signals. Automatic Gain Control (AGC) circuitry (not shown) adjusts the total power of the received signal to a predetermined value. Additional frequency conversion circuitry (not shown) mixes the intermediate frequency signals to analog baseband signals, which are then converted to digital base band signals via an analog-to-digital converter (not shown). The digital baseband signals include In-phase (I), Quadrature (Q), and noise signal components.

Similarly, the CDMA transmitter 52 includes frequency conversion circuitry (not shown) for converting digital input signals (having in-phase and quadrature signal components) output from the encoder 76 to analog radio frequency signals in preparation for transmission via the antenna 46.

The sample RAM 58 in the baseband processor 54 samples the digital baseband signals received from the CDMA receiver 50 at predetermined time slots. The sample RAM 58 maintains the samples in a buffer (not shown) for use by offline processing circuitry as discussed more fully below. The predetermined time slots at which the sample RAM 58 performs sampling of the received signal are determined in accordance with IS-95 telecommunications standards. The sample RAM 58 may be selectively bypassed when the mobile station 26 is not operating in slotted mode via an enable signal received from the controller 56. Other systems and methods for selectively bypassing the sample RAM 58 may be employed without departing from the scope of the present invention.

The length of the signal sample taken by the sample RAM 58 is directly related to the size of the sample RAM 58. The sample RAM 58 samples the signal environment, i.e., the received signal, to gather sufficient information pertaining to a QPCH of the received signal to facilitate offline processing. As discussed more fully below, the unique design of the present invention helps minimize the required size of the sample RAM 58.

An output of the sample RAM 58 is connected to the interpolator 60. The interpolator 60 upconverts a digital signal output from the sample RAM 58 to a higher digital frequency. In the present specific embodiment, the rate of the digital signal output from the sample RAM 58 is equivalent to the rate of the received digital signal, which is twice the chip rate. The interpolator 60 converts the rate of the digital signal to eight times the chip rate (CHIP×8). Those skilled in the art will appreciate that the exact rates of digital signals employed by the mobile station 26 are application-specific and may be determined by one skilled in the art to meet the needs of a given application.

When the sample RAM 58 has sampled the received signal, the interpolator 60 provides an up-converted digital signal having in-phase and quadrature signal components to the searcher 62 and the despreader/decover circuit 66. The searcher 62 analyzes the received digital signal and outputs candidate pilot peaks (one peak for each multipath component) to the controller software/circuitry 56.

In one embodiment of the present invention, the searcher 62 is implemented in accordance with the teachings of the U.S. Provisional Patent Application No. 60/176,478, entitled "EFFICIENT SYSTEM AND METHOD FOR FACILITATING QUICK PAGING CHANNEL DEMODULATION VIA AN EFFICIENT OFFLINE SEARCHER IN A WIRELESS COMMUNICATIONS SYSTEM", filed Jan. 17, 2000, assigned to the assignee of the present invention and incorporated herein by reference. Alternatively, the searcher 62 may be implemented as a pilot despreader that may be constructed by one skilled in the art with access to the present teachings, without departing from the scope of the present invention.

The pilot estimator 68 may be implemented as a Finite Impulse Response Filter (FIR) or an Infinite Impulse Response Filter (IIR). The pilot estimator 68 filters noise from the noisy pilot signal provided by the searcher 62 and provides a pilot signal estimate ($\hat{P}$) in response thereto. The pilot signal estimate $\hat{P}$ includes in-phase ($I_{pilot_k}$) and quadrature ($Q_{pilot_k}$) signal components associated with the $k^{th}$ pilot multipath signal component and is represented by the following vector ($\hat{P}_k$):

$$\hat{P}_k = (I_{pilot_k}, Q_{pilot_k}), \qquad [1]$$

An additional subscript, such as 1 or 2 is added to specify whether a given signal component corresponds to a first symbol or a second symbol, respectively, of a slot of a received QPCH signal. For example, $\hat{P}_{1_k} = (I_{pilot1_k}, Q_{pilot1_k})$ refers to the $k^{th}$ multipath pilot estimate associated with the first QPCH symbol. A pilot signal is associated with or corresponds to a QPCH symbol when the pilot signal is received approximately simultaneously with the QPCH symbol (if there is one) and is provided in the same signal sample of the sample RAM 58.

The pilot signal estimate $\hat{P}_k$ is provided to the demodulator 72 and the pilot energy computation circuit 70. The pilot energy computation circuit 70 squares the pilot signal estimate $\hat{P}_k$ and provides an estimate of the energy ($E_{pilot_k}$) of the $k^{th}$ pilot multipath signal component to the QPCH combiner 40. The pilot energy $E_{pilot_k}$ includes a first component $E_{pilot1_k}$ associated with the first QPCH symbol of a QPCH slot and a second component $E_{pilot2_k}$ associated with the second QPCH symbol of the QPCH slot. The QPCH combiner 40 includes an integrator (not shown) for summing the pilot energies $E_{pilot1_k}$ and $E_{pilot2_k}$ over the k pilot multipaths to yield $E_{pilot1}$ and $E_{pilot2}$, respectively, in accordance with the following equations:

$$E_{pilot1} = \sum_k E_{pilot1_k}, \quad [2]$$

$$E_{pilot2} = \sum_k E_{pilot2_k}, \quad [3]$$

where $E_{pilot1_k}$ is the pilot energy associated with the $k^{th}$ multipath signal component of the first QPCH symbol of a QPCH slot, and $E_{pilot2_k}$ is the pilot energy associated with the $k^{th}$ multipath signal component of the second QPCH symbol of the QPCH slot.

The despreader/decover circuit 66 includes a pseudo-noise despreader (not shown) and an M-ary Walsh decover circuit (not shown) for decovering a pilot channel, a data channel, a primary paging channel, and a QPCH from the received signal output from the interpolator 60, if they exist in the received signal. M is 64 in the present embodiment. The decovered channels are provided to the demodulator 72.

The demodulator 72 computes the dot product, cross product, or both (depending on the modulation format of the QPCH) between a QPCH signal received from the despreader/decover circuit 66 and the pilot estimate $\hat{P}_k$ output from the pilot estimator 68. In the present specific embodiment, the QPCH signal includes a slot having a first symbol and a second symbol defined in accordance with the IS-95 telecommunications standard.

The dot product ($dot_1$) of the first QPCH symbol (QPCH1) with the corresponding pilot estimate $\hat{P}_{1_k}$ is defined in accordance with the following equation:

$$dot_1 = \sum_k (I_{pilot1_k} I_{QPCH1_k} + Q_{pilot1_k} Q_{QPCH1_k}), \quad [4]$$

where k is the number of available multipath components of the received signal; $I_{pilot1_k}$ is the in-phase component of the pilot estimate associated with $k^{th}$ multipath component of the first QPCH symbol of the slot; $I_{QPCH1_k}$ is the in-phase component of the $k^{th}$ multipath component of the first QPCH symbol; $Q_{pilot1_k}$ is the quadrature component of the $k^{th}$ multipath component of the pilot estimate associated with the first QPCH symbol; and $Q_{QPCH1_k}$ is the quadrature component of the $k^{th}$ multipath component of the first QPCH symbol of the QPCH signal.

Similarly, the dot product ($dot_2$) of the second QPCH symbol (QPCH2) with the corresponding pilot estimate $\hat{P}_{2_k}$ is defined in accordance with the following equation:

$$dot_2 = \sum_k (I_{pilot2_k} I_{QPCH2_k} + Q_{pilot2_k} Q_{QPCH2_k}), \quad [5]$$

where the individual symbols are similar to those defined above for equation (4) but are associated with the second QPCH symbol of a slot rather than the first QPCH symbol of the slot.

Additional details of quick paging channels employed for the purposes of offline processing are disclosed in U.S. Pat. No. 6,111,865, issued Aug. 29, 2000, entitled DUAL CHANNEL SLOTTED PAGING, assigned to the assignee of the present invention and incorporated herein by reference. Further QPCH details are disclosed in copending U.S. patent application Ser. No. 09/252,846, filed Feb. 19, 1999, entitled A METHOD AND APPARATUS FOR MAXIMIZING STANDBY TIME USING A QUICK PAGING CHANNEL, assigned to the assignee of the present invention and incorporated herein by reference.

The demodulator 72 computes the first dot product ($dot_1$) associated with the first QPCH symbol, the second dot product ($dot_2$) associated with the second QPCH symbol, and/or the cross products $cross_1$ and $cross_2$ associated with the first and second QPCH symbols, respectively, and provides the results to the QPCH combiner 40. The cross products $cross_1$ and $cross_2$ are defined in accordance with the following equations:

$$cross_1 = \sum_k (I_{pilot1_k} Q_{QPCH1_k} - Q_{pilot1_k} I_{QPCH1_k}), \quad [6]$$

$$cross_2 = \sum_k (I_{pilot2_k} Q_{QPCH2_k} - Q_{pilot2_k} I_{QPCH2_k}), \quad [7]$$

where the individual symbols are as defined above for equations (4) and (5).

Whether the demodulator 72 computes dot products and/or cross products is application-specific and depends on the mode of the system 26. For example, in 1 Multi-Carrier (1×MC) systems without Orthogonal Transmit Diversity (OTD) (1×MC non OTD), the demodulator 72 computes dot and cross products in accordance with equations (4) through (9) and outputs $dot_1+cross_1$ and $dot_2+cross_2$ to the QPCH combiner 40. In 3 Multi-Carrier (3×MC) systems and in 1×MC systems with OTD, the demodulator 72 outputs dot products, cross products, or sums of dot and cross products depending on the needs of a given application. With reference to the present teachings, the appropriate demodulator output may be determined by one ordinarily skilled in the art to meet the needs of a given application. The additions of the dot and cross products ($dot_1+cross_1$ and $dot_2+cross_2$) may be performed in the QPCH combiner 40 without departing from the scope of the present invention.

The output of the demodulator 72 that is input to the QPCH combiner 40 is denoted $QP_1$ for outputs associated with the first QPCH symbol of a slot and $QP_2$ for outputs associated with the second QPCH symbol of a slot. Various outputs of the demodulator 72 for various system modes are summarized in the following table:

TABLE 1

| Mode | Quick Page Calculation (QP) |
| --- | --- |
| 1×MC non OTD | $QP_1 = dot_1 + cross_1$, |
|  | $QP_2 = dot_2 + cross_2$ |
| 1×MC OTD, or 3×MC | $QP_1 = dot_1, cross_1,$ or $dot_1 + cross_1$ |
|  | $QP_2 = dot_2, cross_2,$ or $dot_2 + cross_2$ |

Alternatively, another combinative function of the pilot estimate and the first and second QPCH symbols may be provided to the QPCH combiner 40 in addition to or instead of the dot and/or cross products, without departing from the scope of the present invention.

The demodulator 72 may also provide a data/traffic signal, if available, to the Viterbi decoder 74 when the mobile station 26 is handling a call or other type of traffic channel. The decoder 74 may then decode the data/traffic signal, which may represent voice or another type of data, and forward the decoded signal to the controller 56. The controller 56 employs various hardware and/or software modules (not shown) to route the decoded signals to a microphone or to another software or hardware function (not shown).

The QPCH combiner 40 computes a first decision parameter ($CSI_1$), which is the normalized pilot energy, and is described by the following equation:

$$CSI_1 = \frac{E_{pilot1}}{\hat{I}_{o1}}, \quad [8]$$

where $CSI_1$ is the normalized pilot energy associated with the first QPCH symbol of a slot; $E_{pilot1}$ is the energy of the portion of the pilot signal summed over all multipath components and received simultaneously with the first QPCH symbol; $\hat{I}_{o1}$ is the total energy of the portion of the received signal, including noise and interference, received simultaneously with the first QPCH symbol.

Similarly, the QPCH combiner 40 computes, as needed, a second decision parameter $CSI_2$ for the second QPCH symbol of a slot in accordance with the following equation:

$$CSI_2 = \frac{E_{pilot2}}{\hat{I}_{o2}}, \quad [9]$$

where the symbols are as described above for equation (10) but are associated with the second QPCH symbol of a slot.

In the present specific embodiment, $\hat{I}_{o1}$ and $\hat{I}_{o2}$ are predetermined via AGC circuitry and Gain Control Amplifiers (GCA's) (not shown) in the CDMA receive chain 50, however, $\hat{I}_{o1}$ and $\hat{I}_{o2}$ may be estimated via energy estimators or determined via other mechanisms without departing from the scope of the present invention.

A third decision parameter $D_1$ is a novel decision metric representative of the value of the first QPCH symbol of the QPCH slot that is described by the following equation:

$$D_1 = \frac{QP_1}{E_{pilot1}}, \quad [10]$$

where $QP_1$ and $E_{pilot1}$ are as described above. Note that the decision parameter $D_1$ is not a function of $\hat{I}_{o1}$ since received signals are gain controlled (via AGC circuitry) to a specific target level.

The QPCH combiner 40 sums the parameters $CSI_1$ and $D_1$ over all available multipath components and provides the results to the page detector 42 when requested by the page detector 42, which behaves in accordance with a unique method of the resent invention as discussed more fully below. With access to the present teachings, those skilled in the art may build a QPCH combiner and page detector suitable for use with the present invention.

The QPCH combiner 40 employs the Quick Paging (QP) values $QP_1$ and $QP_2$, the pilot energy estimates $E_{pilot1}$ and $E_{pilot2}$, and received signal energy estimates $\hat{I}_{o1}$ and $\hat{I}_{o2}$ associated with the first and second QPCH symbols, respectively, to compute the demodulation symbol, i.e., decision metric D, when requested by the page detector 42, in accordance with the following equation:

$$D = \frac{QP_1 + QP_2}{E_{pilot1} + E_{pilot2}}, \quad [11]$$

where D incorporates both the first symbol and the second symbol of the received QPCH slot and is representative of the value, either on or off, of the QPCH page corresponding to the slot. The remaining parameters are as described above.

The page detector 42 selectively compares parameters $CSI_1$, $CSI_2$, $D_1$, and D to predetermined thresholds to determine whether the mobile station 26 should subsequently power-up the CDMA receiver 50 to receive and process a forthcoming full page sent via the primary paging channel, as discussed more fully below. When the page detector 42 determines that a forthcoming full page should be received and processed based on one or more comparisons of the above parameters ($CSI_1$, $CSI_2$, $D_1$, and D) with predetermined thresholds, an appropriate indication is sent to the controller 56 indicating that the CDMA receiver 50 should be activated in accordance with IS-95 standards to receive and demodulate an immediately forthcoming primary paging channel. The controller 56 then activates the CDMA receiver 50 and places the sample RAM 58 in bypass mode via control signals delivered via the bus 78 at a time corresponding to a slot during which the primary paging channel is to be received. The decoder 74 is automatically enabled via signaling information contained in the received signal.

When the mobile station 26 receives the full page on the primary paging channel, the page is despread via the despreader/decover circuit 66, combined over multipath components via the demodulator 72, and provided to the decoder 74, where the page is decoded. Constituent page information is forwarded from the decoder 74 to the controller 56. Software and/or hardware circuitry known in the art (not shown) within the controller 56 interprets the page. If the page indicates an incoming call associated with a forthcoming traffic channel, the controller 56 issues appropriate control commands to various modules within the mobile station 26 to prepare the mobile station 26 to handle the forthcoming traffic channel.

If the primary paging channel should not be processed based as determined from one or more of the parameters $CSI_1$, $CSI_2$, $D_1$, and D, then an indication specifying that a full page on the primary paging channel is not forthcoming is sent to the controller 56. The controller 56 then powers-down the transceiver section 44 and enters the mobile station 26 into a sleep state as defined in the IS-95 telecommunications standards. The QPCH is On-Off Keying (OOK) modulated, and the values of $D_1$ and D help indicate the presence or absence (on or off, respectively) of a forthcoming paging channel.

The mobile station 26 is equipped with a unique system, as discussed more fully below, substantially implemented via the QPCH combiner 40, page detector 42, and associated memory 80, to facilitate the successful establishment of a traffic channel between the mobile station 26 and an associated wireless communications system (see FIG. 1) when a page is sent to the mobile station 26 via the wireless communications system indicating the presence of a forthcoming call.

Figure 3:
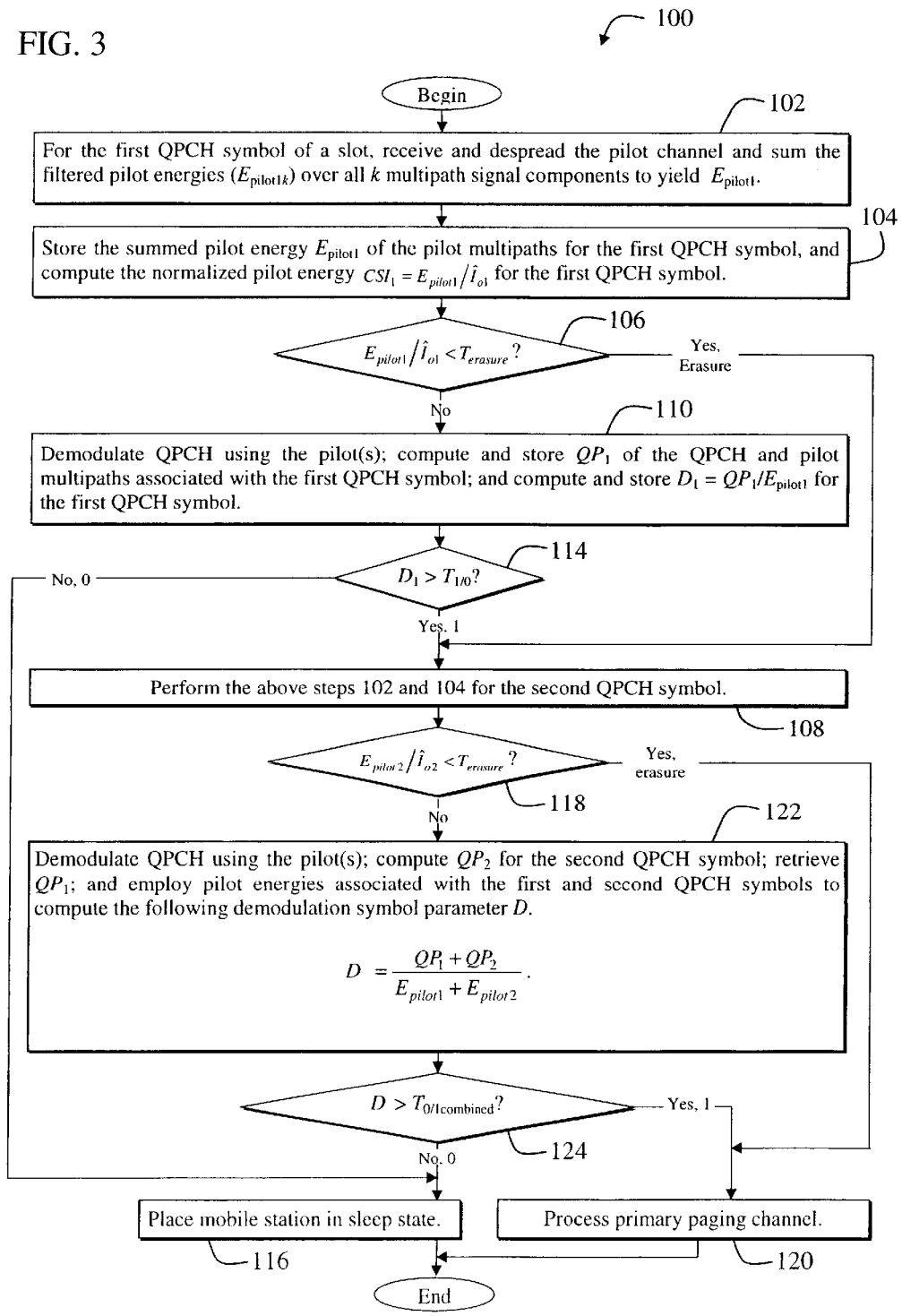
FIG. 3 is a flow diagram of a method implemented by the mobile station of FIG. 2 via the QPCH combiner, the QPCH memory, and the QPCH detector of FIG. 2.

FIG. 3 is a flow diagram of a method 100 implemented by the mobile station 26 of FIG. 2 via the QPCH combiner 40 and QPCH detector 42 of FIG. 2. With reference to FIGS. 2 and 3, in an initial receiving step 102, a digital received signal is output from the interpolator 60. The received signal includes a pilot signal component and a QPCH signal component that includes a first QPCH symbol of a QPCH slot. The pilot estimator 68 outputs pilot signal components, corresponding to the first QPCH symbol, from the digital received signal and provides the pilot signal components to the pilot energy computation circuit 70, which computes and sums the pilot energies over all available multipaths in accordance with equation (2) to yield $E_{pilot1}$. The resulting pilot energy $E_{pilot1}$ is an estimate of the energy of the pilot signal associated with the first QPCH symbol. Subsequently, control is passed to a signal quality step 104.

In the signal quality step 104, a normalized pilot energy ($CSI_1$) associated with the first QPCH symbol is computed, which is a value representative of a quality of a portion of the digital received signal containing the first QPCH symbol. The $CSI_1$ is computed by dividing the pilot energy $E_{pilot1}$ associated with the first symbol by the total energy of the received signal $I_{o1}$ associated with the portion of the digital received signal containing the first QPCH symbol as defined in equation (8). Subsequently, control is passed to a first erasure-checking step 106.

In the first erasure-checking step 106, $CSI_1=E_{pilot1}/I_{o1}$ is compared to a predetermined erasure threshold $T_{erasure}$ that is stored in the QPCH memory 80. If $CSI_1$ is less than $T_{erasure}$, then erasure is declared. When erasure is declared for the first symbol, the signal environment through which the received signal is propagating is determined to be of insufficient quality to rely on the value of the first metric ($D_1$) to determine whether to receive and process a forthcoming primary paging channel.

In the present specific embodiment, the predetermined erasure threshold $T_{erasure}$ is stored in the QPCH memory 80 associated with the page detector 42. Alternatively, the erasure threshold $T_{erasure}$ may be provided by the controller 56 via a bus (not shown) and dynamically computed in response to a changing signal environment as indicated via the pilot energy output from the pilot energy computation circuit 70 and input to the controller 56.

When erasure is declared in the first erasure-checking step 106, control is passed to a second symbol step 108. Otherwise, control is passed to a first demodulation step 110.

In the first demodulation step 110, the demodulator 72 provides the dot product ($dot_1$) between the first symbol of the QPCH page and the associated pilot signal (see equation (2)) to the QPCH combiner 40. The pilot energy computation circuit 70 provides the energy of the pilot signal ($E_{pilot1}$) associated with the first QPCH symbol to the QPCH combiner 40. The QPCH combiner 40 then computes the first metric $D_1$ in accordance with equation (6). Subsequently, control is passed to a first on-off checking step 114.

In the first on-off-checking step 114, the first decision metric $D_1$ is compared to a first on-off threshold $T_{1/10}$. If $D_1$ is less than $T_{1/10}$, then control is passed to a sleep step 116, where the transceiver 44 is powered-down and the mobile station 26 is placed in a sleep state. If $D_1$ is greater than $T_{1/10}$, then control is passed to the second symbol step 108.

In the second symbol step 108, steps 102 and 104 are performed for the second QPCH symbol of the QPCH slot corresponding to the QPCH page of the received signal to yield values for $QP_2$ (see table (1)) and $E_{pilot2}$. The QPCH combiner 40 then computes $CSI_2$ by dividing $QP_2$ by $E_{pilot2}$. Subsequently, control is passed to a second erasure-checking step 118.

In the second erasure-checking step 118, $CSI_2$ is compared to the erasure threshold $T_{erasure}$, which may be different from the corresponding erasure threshold employed in the first erasure-checking step 106 without departing from the scope of the present invention. If $CSI_2$ is less than $T_{erasure}$, then control is passed to a primary paging step 120, where the forthcoming primary paging channel is received and processed in accordance with IS-95 telecommunications standards. Otherwise, control is passed to a second demodulation step 122.

In the second demodulation step 122, the second symbol of the QPCH slot is processed via the QPCH combiner 40 in response to control commands received from the QPCH detector 42 to yield the decision metric D in accordance with equations (11). Those skilled in the art will appreciate that both the controller may provide such control commands 56 and the QPCH combiner 40 or only the controller 56 instead of by the QPCH combiner 40 without departing from the scope of the present invention.

Subsequently, control is passed to a second on-off-checking step 124, where D is compared to a combined on-off threshold $T_{0/1combined}$. If D is larger than the combined on-off threshold $T_{0/1combined}$, then control is passed to the primary paging step 120, where the forthcoming primary paging channel is received and processed. Otherwise, control is passed to the sleep step 116 and the mobile station 26 is placed in a sleep state. Hence, the present invention exploits diversity without compromising standby time.

The exact values of the various thresholds, such as the erasure threshold $T_{erasure}$, the on-off threshold $T_{1/0}$, and the combined on-off threshold $T_{0/0combined}$ are application-specific and may be determined by one skilled in the art to meet the needs of a given application.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

What is claimed is:

1. An efficient system for determining if a primary paging channel should be received and processed via a wireless communications device based on a quick paging channel in a wireless communications system comprising:

first means for receiving an electromagnetic signal having pilot signal and quick paging signal components;

second means for ascertaining if a second symbol of said quick paging channel signal should be immediately analyzed based on a first quality parameter and a first decision metric associated with a first symbol of said quick paging signal and providing a first indication in response thereto, said first decision metric representative of a value of said first symbol; and third means for determining, via said second symbol, if said primary paging channel should be immediately processed based on a second quality parameter and a second decision metric associated with said second symbol and providing a second indication in response thereto when said first indication indicates that said second symbol should be immediately analyzed.

2. The system of claim 1 wherein said first quality parameter and said second quality parameter are based on a portion of said pilot signal associated with said first symbol and said second symbol, respectively, said first and second quality parameters indicative of a quality of a signal environment in which said electromagnetic signal is propagating.

3. The system of claim 2 wherein said first decision metric is determined in accordance with the following metric ($D_1$):

$$D_1 = \frac{QP_1}{E_{pilot1}},$$

where $D_1$ is said first decision metric; $QP_1$ is a dot product, cross product, or a combination thereof of said first symbol with an estimate of said pilot signal associated with said first symbol; and $E_{pilot1}$ is an energy of said pilot signal associated with said first symbol.

4. The system of claim 3 wherein
said second decision metric is a demodulation symbol (D) determined in accordance with the following equation:

$$D = \frac{QP_1 + QP_2}{E_{pilot1} + E_{pilot2}},$$

where $QP_2$ is a dot product, cross product, or a combination thereof of said second symbol with an estimate of said pilot signal associated with said second symbol; and $E_{pilot2}$ is an energy of said second portion of said pilot signal.

5. An efficient system for determining if a primary paging channel should be received and processed via a wireless communications device based on a quick paging channel in a wireless communications system comprising:
   first means for receiving an electromagnetic signal having pilot signal and quick paging signal components;
   second means for ascertaining whether a first symbol or a signal environment of a second symbol of said quick paging channel signal should be immediately analyzed based on a first quality parameter and providing a first indication in response thereto, said first quality parameter based on said pilot signal and indicative of a quality of a signal environment in which said electromagnetic signal is propagating;
   third means for selectively processing said first symbol to determine a first symbol metric and determining, based on said first symbol metric, if said signal environment of said second symbol should be immediately analyzed and providing a second indication in response thereto when said first indication indicates that said first symbol should be immediately processed;
   fourth means for providing a second quality parameter indicative of a quality of a signal environment in which said electromagnetic signal is propagating based on said pilot signal and determining whether a second metric incorporating said second symbol should be computed or said primary paging channel should be processed based on said second quality parameter associated with said second symbol and providing a fourth indication in response thereto when said third indication indicates that said signal environment of said second symbol should be immediately analyzed; and
   fourth means for determining if said primary paging channel should be processed based on said second metric when said fourth indication indicates that said primary paging channel should not be immediately processed.

6. The system of claim 5 wherein said second metric includes one or more combined decision metrics associated with both said first symbol and said second symbol when said first indication indicates that said second symbol should be processed and providing a second indication response thereto.

7. A system for determining, via a quick paging signal associated with a quick paging channel, whether a forthcoming page on a primary paging channel should be received and processed comprising:
   first means for receiving an electromagnetic signal and providing one or more decision parameters based on a quality of a signal environment through which said received signal propagates and/or based on a value of a first symbol and/or a second symbol of a quick paging channel signal component of said received signal in response to the receipt of said electromagnetic signal and
   second means for selectively comparing said one or more decision parameters associated with a first quick paging channel symbol and/or a second paging channel symbol to one or more corresponding predetermined thresholds in response to said control signal and providing a first indication in response thereto, said first indication indicative of whether said forthcoming paging channel should be received and processed.

8. An efficient method for determining if a primary paging channel should be received and processed via a wireless communications device based on a quick paging channel in a wireless communications system comprising the steps of:
   receiving an electromagnetic signal having pilot signal and quick paging signal components;
   ascertaining if a second symbol of said quick paging channel signal should be immediately analyzed based on a first quality parameter and a first decision metric associated with a first symbol of said quick paging signal and providing a first indication in response thereto, said first decision metric representative of a value of said first symbol; and
   determining, via said second symbol, if said primary paging channel should be immediately processed based on a second quality parameter and a second decision metric associated with said second symbol and providing a second indication in response thereto when said first indication indicates that said second symbol should be immediately analyzed.

9. A system for interpreting a quick paging channel signal in a wireless communications system comprising:
   first means for analyzing a received signal and a signal environment associated with said quick paging channel to determine if one or more symbols of said received signal are valid and providing a first indication in response thereto;
   second means for providing a value indicative of a message included in said quick paging channel based on said first indication and said one or more symbols, wherein said one or more symbols include a first symbol and a second symbol, and said first means includes means for analyzing said signal environment and providing a parameter indicative of said signal environment via a pilot signal included in said received signal; and
   third means for indicating that said first symbol and said second symbol are unreliable based on said parameter and selectively disabling said second means in response thereto.

10. The system of claim 9 wherein said second means includes means for selectively calculating one or more of the following metrics ($D_1$ or $D$):

$$D_1 = \frac{QP_1}{E_{pilot1}}, D = \frac{QP_1 + QP_2}{E_{pilot1} + E_{pilot2}},$$

where $D_1$ is said first decision metric; $QP_1$ is a dot product, cross product, or a combination thereof of said first symbol with an estimate of said pilot signal associated with said first symbol; $QP_2$ is a dot product, cross product, or a combination thereof of said second symbol with an estimate of said pilot signal associated with said second symbol; $E_{pilot1}$ is an energy of said pilot signal associated with said first symbol; and $E_{pilot2}$ is an energy of said second portion of said pilot signal.

11. The system of claim 10 wherein said second means includes means for comparing one or more of said metrics to one or more predetermined thresholds and providing said value in response thereto.

12. A system for interpreting a quick paging channel signal in a wireless communications system comprising:
 a receiver circuit having an antenna and a receive chain;
 a pilot estimation circuit in communication with said receiver;
 a total received energy computation circuit in communication with said receiver;
 a quick paging channel symbol combiner in communication with said pilot estimation circuit, said total received energy computation circuit, and said receiver; and
 a page detector in communication with said quick paging channel symbol combiner.

13. The system of claim 12 wherein said receiver further includes a sample random access memory (RAM) connected at an output of said receive chain, an interpolator connected at an output of said sample random access memory, a despreading circuit.

14. The system of claim 13 wherein said despreading circuit includes a demodulator.

15. The system of claim 13 wherein said sample RAM and said interpolator are included in a digital baseband processor.

16. The system of claim 15 wherein said pilot estimation circuit includes a pilot estimator in communication with a pilot energy computation circuit.

17. An efficient method for determining if a primary paging channel should be received and processed via a wireless communications device based on a quick paging channel in a wireless communications system comprising the steps of:
 receiving an electromagnetic signal having pilot signal and quick paging signal components;
 ascertaining if a second symbol of said quick paging channel signal should be immediately analyzed based on a first quality parameter and a first decision metric associated with a first symbol of said quick paging signal and providing a first indication in response thereto, said first decision metric representative of a value of said first symbol; and
 determining, via said second symbol, if said primary paging channel should be immediately processed based on a second quality parameter and a second decision metric that incorporates said second symbol and providing a second indication in response thereto when said first indication indicates that said second symbol should be immediately analyzed, said first and second quality parameters indicative of a quality of a signal environment in which said electromagnetic signal is propagating.

* * * * *